United States Patent [19]
Papuchon et al.

[11] 4,288,785
[45] Sep. 8, 1981

[54] LIGHT INTENSITY MODULATOR WITH DIGITAL CONTROL AND A DIGITAL-ANALOG CONVERTER COMPRISING SUCH A MODULATOR

[75] Inventors: Michel Papuchon; Claude Puech; Jean C. Anne, all of Paris, France

[73] Assignee: Thomson-CSF, Paris, France

[21] Appl. No.: 151,616

[22] Filed: May 20, 1980

[30] Foreign Application Priority Data

May 23, 1979 [FR] France ................. 79 13194

[51] Int. Cl.³ .............................................. H03K 13/02
[52] U.S. Cl. ........................... 340/347 DA; 350/96.14
[58] Field of Search ............... 340/347 DA, 347 M; 350/355, 96.12, 96.13, 96.14

[56] References Cited

U.S. PATENT DOCUMENTS

| | | | |
|---|---|---|---|
| 3,920,314 | 11/1975 | Yajima | 350/96.14 |
| 3,957,340 | 5/1976 | Giallorenzi | 350/96.14 |
| 4,070,094 | 1/1978 | Martin | 350/96.14 |
| 4,223,977 | 9/1980 | Papuchon | 350/96.14 |

OTHER PUBLICATIONS

Hudson "RCA Technical Notes" TN No. 928, Apr. 26, 1973, pp. 1-3.
Hardy "IBM Technical Disclosure Bulletin" vol. 7 No. 6 Nov. 1964 pp. 480-481.
Hammer "Applied Physics Letters" vol. 18 No. 4 Feb. 15, 1971 pp. 147-149.
Papuchon "Electronics Letters" Feb. 14, 1980 vol. 16 No. 4 pp. 142-144.

*Primary Examiner*—Charles D. Miller
*Attorney, Agent, or Firm*—Cushman, Darby & Cushman

[57] ABSTRACT

The invention relates to a light intensity modulator controlled by a "word" of n bits and an opto-electronic digital-analog converter.

The modulator comprises a two-arm interferometer in whose length there is created, by opto-electrical effect, successive phase shifts controlled respectively by control bits and whose values, when the control bits are in state 1, conform to the successive powers of 2. The total phase shift obtained thus depends directly on the analog value of the control word and the emerging intensity is modulated as a function of this word. A digital-analog converter is constructed by adding a photodetector means whose output voltage depends on the analog value of the control word.

8 Claims, 9 Drawing Figures

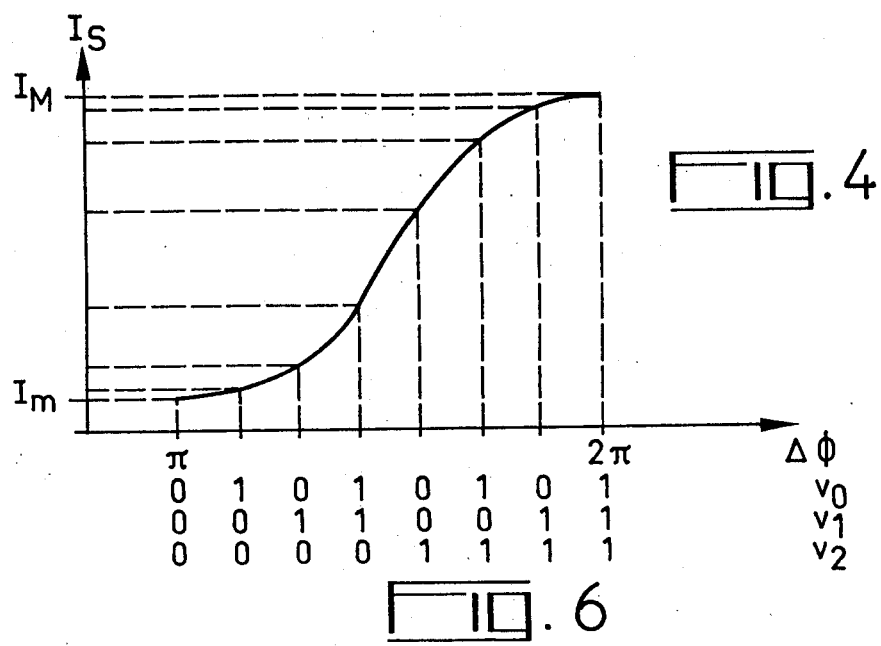
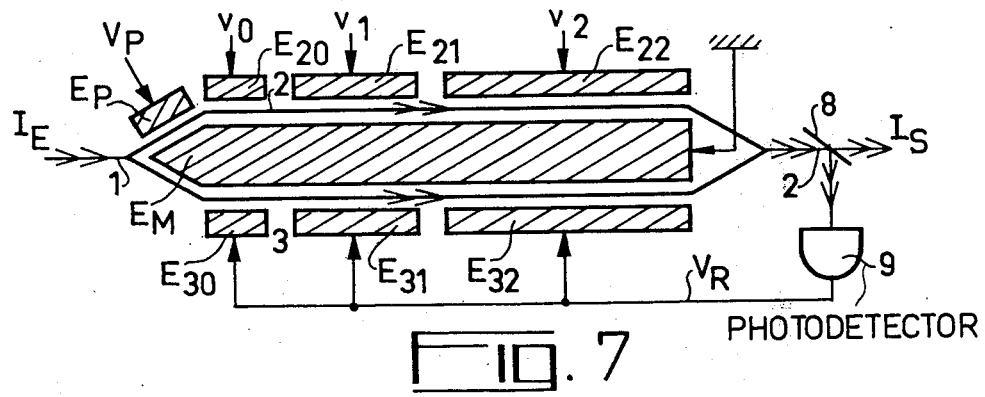
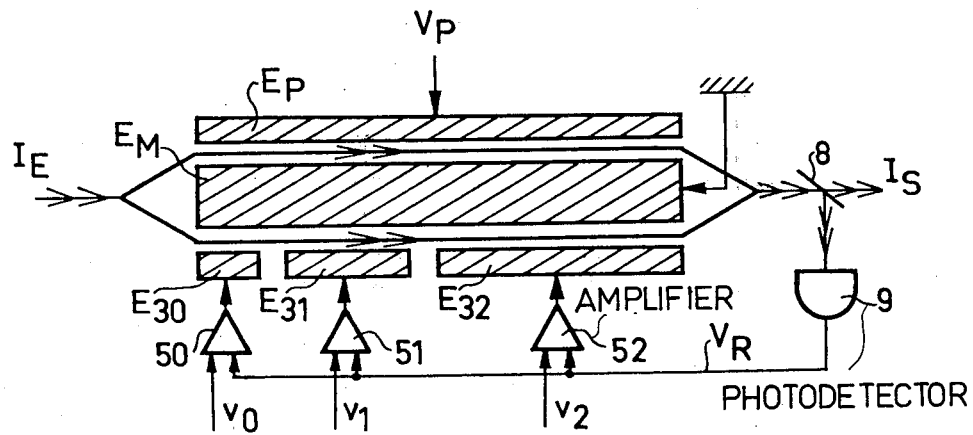

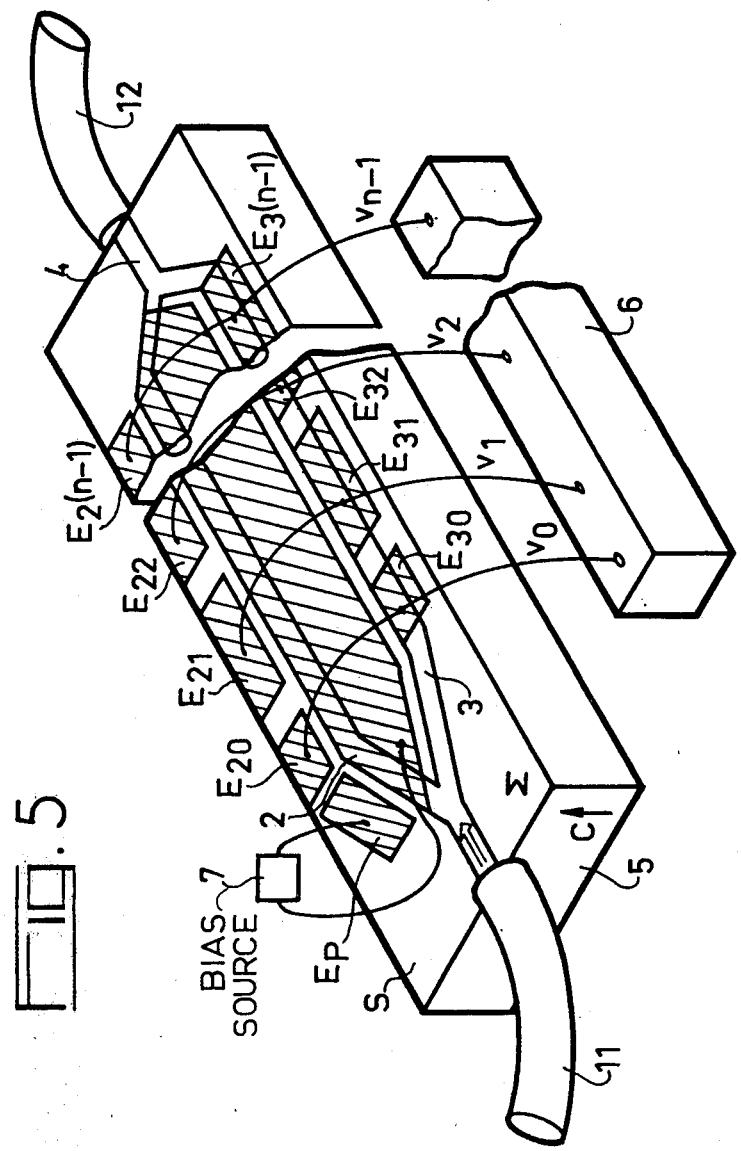

LIGHT INTENSITY MODULATOR WITH DIGITAL CONTROL AND A DIGITAL-ANALOG CONVERTER COMPRISING SUCH A MODULATOR

BACKGROUND OF THE INVENTION

The invention relates to a digitally controlled light intensity modulator, constructed with integrated optics.

It is known to construct light modulators controlled by an analog voltage, from a two-arm interferometer in which there is created, by an electro-optical effect, a difference in the propagation speed between the two arms, producing an electrically controlled phase shift. The emerging light intensity varies with the phase shift and is therefore modulated by the analog voltage inducing the electro-optical effect. The response of such a modulator is sinusoidal but may be linearized by adding an optoelectronic feedback loop. This improvement is described in French patent application No. 79.08 372 filed by the applicant.

SUMMARY OF THE INVENTION

The invention aims at using the same optical structure to construct a multiple-control signal modulator, these signals being moreover digital, i.e. having two voltage states. A digitally controlled modulator finds in fact numerous applications in the telecommunication and data processing fields. For suh a modulator to be compatible with all existing electronic circuits, the control voltages must be low, preferably of the same order of size as the voltages used in TTL logic (0–5 volts).

By choosing the position of the electrodes and the crystalline orientation of the substrate in which the interferometer is constructed, it can be arranged for the electric field created between the electrodes to act on the speeds of propagation of the waves only in the portions of the arms situated opposite these electrodes. By juxtaposing along the interferometer several sets of electrodes to which control voltages are respectively applied, the corresponding positions of the interferometer may be acted on independently, with negligible interaction between the different sets of electrodes. To obtain digital control, the light intensity response must depend on the respective weights of the different control bits. For that, the invention uses either sets of electrodes of different lengths, in a geometrical progression in conformity with the successive powers of 2, or sets of electrodes of the same length, the control bits being applied to voltage dividers whose voltage ratios conform to the successive powers of 2. These two processes enable successive phase shifts to be obtained whose values, when the control bits are at state 0, conform to the successive powers of 2. Furthermore, it is possible to obtain adjustment of the zero (the output intensity is minimum when all the bits are at 0) by means of polarizing electrodes to which an adjustable voltage is applied.

DESCRIPTION OF THE DRAWINGS

The invention will be better understood from the following description and accompanying drawings.

FIG. 4 shows the response curve of the modulator of FIG. 3.

FIG. 5 shows one embodiment of the invention.

FIGS. 6, 7 and 8 are diagrams of different embodiments of the invention.

DESCRIPTION OF THE PREFERRED EMBODIMENTS.

Figure 1:
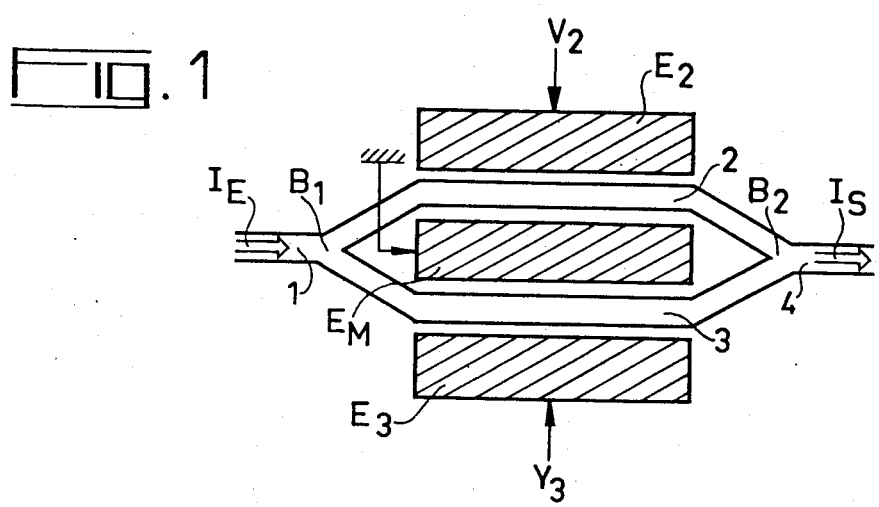
FIG. 1 shows a two-arm interferometer of a known type.

FIG. 1 shows a two-arm interferometer of a known type able to serve to modulate light intensity. This interferometer comprises a monomode wave-guide branch 1 into which is coupled a light wave of intensity $I_E$. This branch 1 forks at a fork $B_1$ into two parallel arms 2 and 3 forming monomode guides which join up again at a fork $B_2$ to extend into monomode wave-guide branch 4 where an intensity $I_S$ may be recuperated. The directions of propagation of the light are the same in the four guides. Electrodes are disposed on each side of each of guides 2 and 3, for example a central electrode $E_M$, an electrode $E_2$ on the other side of arm 2 and to which a voltage $V_2$ is applied and an electrode $E_3$ on the other side of arm 3 and to which a voltage $V_3$ is applied, electrode $E_M$ being connected to ground. The arrangement of the electrodes chosen for the figure, i.e. not overlapping the guides but being adjacent thereto, causes in each of guides 2 and 3 electric fields perpendicular to the direction of propagation of the light waves and in the plane of the figure. In this case, the mode of propagation used is a TE mode. The whole of the device is constructed at the surface of a substrate having electro-optical properties, such as lithium niobate ($LiNbO_3$), lithium tantalate ($LiTaO_3$), gallium arsenide (GaAs) . . . . It is for example possible to obtain guides by diffusing titanium in a substrate by conventional photolithography processes. In the case of the figure where the electric fields applied to the guides are in the plane of the figure, it is preferable for the axis c of the lithium niobate to be also in this plane and perpendicular to the direction of propagation common to guides 1 to 4, so as to present the maximum electro-optical effect. If voltages $V_2$ and $V_3$ are of the same sign, the electric fields applied to arms 2 and 3 are in opposite directions, these fields cause variations in the speeds of propagation of the light waves which are opposite in sign for each of the two arms. The difference $\Delta\beta$ between the speeds of propagation in the two arms is proportional to the sum of the amplitudes of the electric fields applied, i.e. practically proportional to the sum of the voltages V. There is obtained, at the position of fork $B_2$, a phase shift $\Delta\phi$ between the two waves from arms 2 and 3 which were originally in phase: $\Delta\phi = \Delta\beta \times L$ where L is the length of action of the electric fields, i.e., in the case of the figure, the length common to the electrodes.

Figure 2:
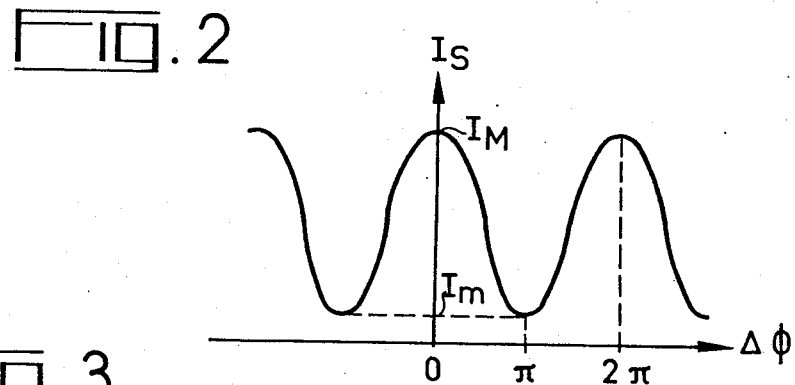
FIG. 2 shows the response curve of the interferometer of FIG. 1.

The intensity $I_S$ recuperated in guide 4 varies as a function of phase shift $\Delta\phi$ according to a sinusoidal law whose variation curve is shown in FIG. 2. The intensity $I_3$ varies between a minimum $I_m$ and a maximum $I_M$, the modulation rate $I_M/I_m$ depending on the coupling losses and on the dissymmetry of the device. When voltage V results from an analog modulation, intensity $I_S$ follows the modulation, provided that the phase shift remains between $2n\pi$ and $(2n+1)\pi$, so as to keep a constant curve slope. This modulation is not linear, except in the vicinity of inflection points ($\Delta\phi = (2n+1)\pi/2$).

Figure 3:
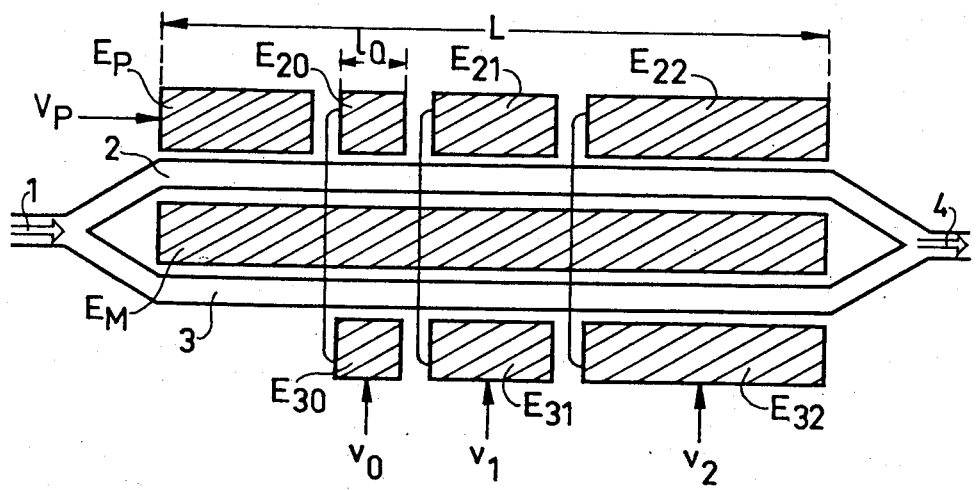
FIG. 3 is a diagram of the modulator in accordance with the invention.

The properties described above of the two-arm interferometer are used in the device of the invention of which the operating diagram is shown in FIG. 3. It is a multiple-control voltage modulator. The modulator of FIG. 3 is digitally controlled: the control voltages are binary signals having two states: state 0 where the voltage is zero and state 1 where the voltage is at a predetermined value v common to all the signals. In the device of the invention, n sets of electrodes are used, n being the number of control voltage inputs. In FIG. 3, n=3. Between the two arms 2 and 3 of the interferometer, there is disposed a central electrode $E_M$ connected to ground. On each side of the arms are disposed symmetric pairs of electrodes: $E_{20}$ and $E_{30}$, $E_{21}$ and $E_{31}$, $E_{22}$ and $E_{32}$. The electrodes of each pair are connected together and are subjected to binary signals: respectively $v_0$, $v_1$, $v_2$. The signals form a control word from a modulation source. Conventionally, $v_0$ is the bit with the smallest weight and $v_2$ the bit with the largest weight. To obtain modulation of the output intensity $I_S$ which takes into account these different weights, the pairs of electrodes have lengths in geometric progression: the length of electrodes $E_{20}$ and $E_{30}$ being equal to $l_0$, the length of electrodes $E_{2n}$ and $E_{3n}$ receiving a signal $v_n$ is equal to $l_n = 2^n l_0$ (thus $l_1 = 2l_0$ and $l_2 = 4l_0$). Since the phase shift produced by the electro-optical effect between the waves circulating in arms 2 and 3 is, for an equal control voltage, proportional to the length of action, it can be seen that the effect of the different bits on the phase shift depends directly on their weight. Furthermore, the successive phase shifts introduced by the successive voltages $v_0$, $v_1$, ... cumulate and the total phase shift obtained at the position of fork $B_2$ is representative of the analog value corresponding to the word formed by the different input bits.

In the embodiment shown, it is arranged for the mode of action of the input voltages to be such that the total phase shift $\Delta\phi$ is equal to $\pi$ when all the bits are at state 0 and equal to $2\pi$ when all the bits are at state 1. Thus, when the analog value corresponding to the input word runs through the whole range of possible values, the output intensity $I_S$ increases uniformly from its minimum value $I_m$ to its maximum value $I_M$. The different values of $I_S$ corresponding to the different possible words are obtained from the curve of FIG. 4 which originates from that of FIG. 2. As abscissa are shown the cumulated phase shift $\Delta\phi$ and the voltage values $v_0$, $v_1$, $v_2$ which lead thereto. As ordinates are shown the corresponding values of the output intensity. To satisfy the first condition: $\Delta\phi = \pi$ when all the control voltages are zero, it is necessary to introduce this phase shift by $\pi$ between the two arms. In fact, in the absence of any voltage, the output intensity is maximum. To this end, an additional polarization electrode $E_P$ is provided subjected to a constant voltage $V_P$ and of length $l_P$, so that $k\, l_P V_P = \pi$. This electrode $E_P$ may be situated, for example, on the same side as electrodes $E_{20}$, $E_{21}$, $E_{22}$, facing a portion of electrode $E_M$. To satisfy the second condition: $\Delta\phi = 2\pi$ when all the control bits are in state 1, the values of $l_0$ and v must be suitably chosen. The total phase shift $\Delta\phi$ holds good in the general case with n electrodes:

$$\Delta\phi = k[l_P V_P + 2l_0 v_0 + 2l_1 v_1 + \ldots + 2l_{n-1} S_{n-1}]$$

with:

$$kl_P V_P = \pi, v_0 = v_1 = v_2 = v, l_1 = 2l_0 \text{ and } l_2 = 4l_0,$$

we obtain $$\Delta\phi = \pi + 2kl_0 v(1 + 2 + \ldots + 2^{n-1}) = \pi + 2kl_0 v(2^n - 1).$$

If v is for example fixed by the electronic modulation means, the value of $l_0$ is thus determined allowing $\Delta\phi = 2\pi$ to be obtained.

FIG. 5 shows a first embodiment of the invention. The modulator is formed from a substrate 5 made from lithium niobate. The guides 1, 2, 3, 4 are formed by photolithography by localized diffusion of titanium on one of the faces $\Sigma$ of the substrate. The orientation of axis c of the substrate has been chosen perpendicular to the surface $\Sigma$. The total length of arms 2 and 3 is chosen so as to be greater than the sum $l_0 + l_1 + \ldots l_{n-1}$. The light energy coupled to guide 1 may for example come from an optical fiber 11, the coupling being effected directly on the edge of the substrate. Similarly, the emerging wave may be recuperated by an optical fiber 12 at the other end of the substrate. Because of the orientation chosen for the lithium niobate, the electrodes are disposed so that the electric fields created in guides 2 and 3 are parallel to the axis c so perpendicular to surface $\Sigma$. In this case, the propagation mode used in the guides is a TM mode. For that, it is necessary for one of the electrodes of each pair $E_{2i} - E_M$ *and* $E_{3i} - E_M$ to overlap respectively guides 2 and 3. It has been chosen for $E_M$ to overlap guide 2 and $E_{30}, \ldots, E_{3n-1}$ to overlap guide 3.

Thus, the voltages applied to the pairs of electrodes $E_{2i}$ $E_{3i}$ with respect to electrode $E_M$ connected to ground cause in guides 2 and 3 electric fields in opposite directions whose effects on the phase shift are added together. The binary signals $v_0, \ldots v_{n-1}$ originate in a modulating source 6. The polarizing voltage $V_P$ comes from an adjustable DC voltage source 7. Electrode $E_P$ is placed on the slanting part of electrode 2, close to fork $B_1$.

The device shown was constructed for a 6-bit control with guides having a length of 2 microns, a distance between arms of 60 microns and a fork angle of 1°. Thus, the direction of propagation in the slanting part is practically the same as in guides 1, 2, 3, 4.

A length $l_0 = 0.3$ mm was chosen, so that the total length of action of the control electrodes is $(2^6 - 1) l_0 = 18.9$ mm. It has been possible to measure that, when all the control bits are in state 1, by choosing v=1 V, a phase shift range is obtained equal to $\pi$, which is the result sought. To have a polarizing voltage of the order of 5 V, the length $l_P$ must be of the order of $$l_P = \frac{(2^6 - 1)l_0}{V_P} = 4 \text{ mm}.$$

By finely adjusting the value of $V_P$, when all the bits are in state 0, a very low minimum value of $I_m$ is obtained, since the modulation rate measured $I_M/I_m$ is of the order of 95%. The voltage values (v=1 V, $V_P$=5 V) are compatible with electronic circuits constructed according to the TTL technology.

Instead of seeking a phase shift range equal to $\pi$, which leads with the device of FIG. 4 to a non-linear distribution of the emerging intensity, this range may be reduced so as to use the part of the variation curve situated on each side of the inflection point over a more reduced range. If it is desired to keep the same values for v and $V_P$, with the same characteristics of the device; length $l_P$ must be increased and the value of $l_0$ decreased. For example, to divide the range of $\Delta\phi$ (instead of running through the range $\pi-2\pi$, the range $5\pi/4-7\pi/4$ is run through and the range of I is divided by $\sqrt{2}$), it must be arranged for:

$$klpV_P = 5\pi/4.$$

As in the preceding case, we had $k\, l_P V_P = \pi$ with $l_P = 4$ mm, k and $V_P$ being kept, we have $l_P = 5$ mm. Furthermore it is necessary for $2\, k\, l_0\, v\, (2^n-1) = \pi/2$. As in the preceding case, we had $2\, k\, l_0\, v\, (2^n-1) = \pi$ with $l_0 = 0.3$ mm, k, v and n being kept, we have $l_0 = 0.15$ mm. This mode of modulation presents the particularity that the emerging intensity is not zero when all the input bits are in state 0.

There exists another means, preferable to the preceding one, for obtaining practically linear distribution of the emerging intensity, this time over practically the whole of the phase shift range $\pi-2\pi$. This means, described in itself in French patent application filed by the applicant on Apr. 3, 1979, under the number 79.08 372 which relates to a modulator having a single modulating voltage input, consists in using a feedback loop so as to superimpose on the modulating voltage a voltage proportional to the emerging intensity. The use of this process in a digitally controlled modulator is illustrated, in two possible variations, by the diagrams of FIGS. 6 and 7.

According to the variation of FIG. 6, the control bits and the polarizing voltage are applied between the grounded electrode $E_M$ and a series of electrodes disposed on one side of an interferometer: $E_P$, $E_{20}$, $E_{21}$ . . . whose lengths increase in accordance with the powers of 2. The radiation emerging from the interferometer is intercepted by a separator means 8, which may be formed in different ways described in the abovementioned patent application. A fraction of the radiation is applied to a photodetector 9 which is also described in the same patent application, which supplies a feedback voltage $V_R$. This is applied between electrode $E_M$ and a second set of electrodes $E_{30}$, $E_{31}$, . . . having respectively the same length as electrodes $E_{20}$, $E_{21}$ . . . .

The effects of electrodes $E_{2i}$ and $E_{3i}$ on the speed of propagation of light in each branch of the interferometer are thus proportional to the voltages which are respectively applied thereto, with the same coefficient of proportionality.

Instead of separately applying voltages $v_0$, $v_1$ . . . on the one hand and voltage $V_R$, on the other hand, to different sets of electrodes, they may be applied, as shown in the diagram of FIG. 7, to the same set, for example $E_{30}$, $E_{31}$ . . . through summing circuits 50, 51, . . . having two inputs one of which receives voltage $V_R$ and the other bits $v_0$, $v_1$, . . . . The set of electrodes $E_{20}$, $E_{21}$, . . . being omitted, they are replaced by a single polarizing electrode $V_P$.

Many other embodiments including a feedback loop or not are possible, by applying the control bits and possibly the feedback voltage to one or two sets of electrodes, which have lengths increasing in conformity with the powers of 2. When a single set of electrodes is used for the input of the control bits, the products $l_i\, v_i$ must be multiplied by 2 with respect to the case where the control bits are applied to two sets of electrodes and acting therefore on both arms of the interferometer.

Figure 8:
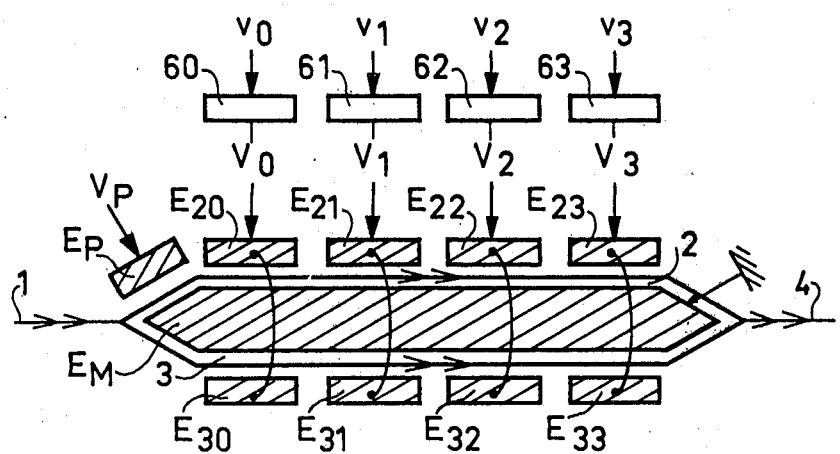

To modulate the light intensity with control words formed of n bits, it is not indispensable to use electrodes of unequal length. FIG. 8 illustrates an embodiment in which all the control electrodes have the same length. Since the phase shift between the waves propagated in the two arms is proportional to the voltage x electrode length product, it is necessary, to achieve the different weights, to effect the weighting on the voltages instead of the lengths. This is why the modulator shown in FIG. 8 comprises, besides the interferometer associated with the polarizing electrode $E_P$ receiving voltage $V_P$ and electrodes $E_{20}$, $E_{21}$, . . . connected respectively to electrodes $E_{30}$, $E_{31}$, . . . voltage dividers 60, 61, 62, 63 receiving respectively the voltage bits 0 and v and delivering respectively voltages $V_0$, $V_1$, $V_2$, $V_3$ with $$V_0 = \frac{v_0}{2^3 r},\ V_1 = \frac{v_1}{2^2 r},\ V_2 = \frac{v_2}{2r}\ \text{and}\ V_3 = \frac{v_3}{r}$$

where r is a ratio of division chosen as a function of v and of the value of the lengths of the control electrodes. The operation of the modulator of FIG. 8 is identical to that of FIG. 3. A digitally controlled modulator may be constructed with electrodes of the same length by using all the above-described variations, and particularly by associating therewith a feedback loop for linearizing its response.

Figure 9:
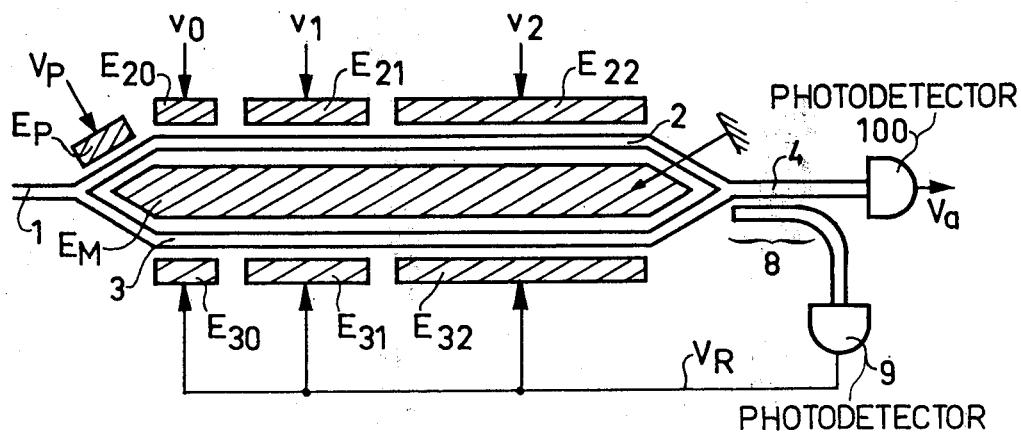
FIG. 9 is a diagram of a digital-analog converter in accordance with the invention.

The modulator of the invention is particularly applicable to optical transmission systems by means of optical fibers and to the optical processing of data. The low control voltages which it requires, its large passband and its reduced dimensions make it advantageous with respect to the devices already known. One interesting application of this modulator is digital-analog conversion. In effect, since, by suitably choosing the parameters, an increasing emerging intensity may be obtained with a control word which can be associated with an increasing analog value, it is possible to use this property to recuperate an analog voltage whose value will be practically proportional to this analog value. One of the possible means consists in placing a photodetector on the output guide 4 of the interferometer. A diagram of a converter is shown in FIG. 9. It is strongly recommended to use a feedback loop for ensuring linear viariation of the intensity so good quality conversion. At the output of a photodetector 100, a voltage $V_a$ is recuperated corresponding to the analog value of the input word.

It is apparent that within the scope of the invention, modifications and different arrangements can be made other than are here disclosed. The present disclosure is merely illustrative with the invention comprehending all variations thereof.

What is claimed is:

1. A digitally controlled light intensity modulator comprising, on the surface of a substrate having electro-optical properties, a two-arm interferometer connected to an input guide receiving incident optical radiation, the fractions of radiation propagated in the two arms combining at the output of the interferometer in an output guide, the intensity of the emerging radiation depending on the phase shift introduced into the interferometer between the fractions of radiation propagated in the two arms, wherein the phase shift is the sum of n elementary phase shifts successively created along the interferometer respectively by n digital control voltages, these n elementary phase shifts being produced in conformity with a geometrical progression of common ratio 2.

2. The modulator as claimed in claim 1, wherein an adjustable DC source is provided for creating a constant phase shift, so that the emerging intensity is minimum when all the digital control voltages are in state 0.

3. The modulator as claimed in claim 2, wherein the DC voltage is applied between a common grounded electrode for all the control voltages and a polarizing electrode placed in the vicinity of one of the forks of the interferometer.

4. The modulator as claimed in claim 2, wherein the n control voltages are applied between a common grounded electrode, on the one hand, and respectively at least n electrodes placed on the same side with respect to the arms.

5. The modulator as claimed in claim 4, wherein the n electrodes have lengths in a geometric progression of common ratio 2, the n control voltages being applied directly to the electrodes.

6. The modulator as claimed in claim 4, wherein the n electrodes have the same length and wherein the n control voltages are applied to n electrodes through n voltage dividers whose dividing ratios are in a geometric progression of common ratio 2.

7. A digital-analog converter supplying an output voltage corresponding to the analog value associated with a control word formed from n digital voltages, comprising a modulator such as claimed in claim 6, controlled by these n digital voltages, and photodetector means collecting at least a fraction of the intensity of the emerging radiation and supplying said output voltage.

8. The modulator as claimed in claim 1, wherein there is further provided a feedback loop receiving a part of the radiation emerging into the output guide, and inducing n feedback phase shifts which are respectively superimposed on the n phase shifts created by the digital control voltages.

* * * * *